(12) United States Patent
Lawrence

(10) Patent No.: US 11,972,165 B2
(45) Date of Patent: Apr. 30, 2024

(54) CONFIGURING DISPLAY SCREEN COORDINATES

(71) Applicant: Intel Corporation, Santa Clara, CA (US)

(72) Inventor: Sean J. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/582,967

(22) Filed: Jan. 24, 2022

(65) Prior Publication Data

US 2022/0147302 A1    May 12, 2022

Related U.S. Application Data

(63) Continuation of application No. 16/629,164, filed as application No. PCT/US2017/048709 on Aug. 25, 2017, now Pat. No. 11,231,896.

(51) Int. Cl.
*G06F 3/14* (2006.01)
*G09G 5/12* (2006.01)

(52) U.S. Cl.
CPC ............. *G06F 3/1431* (2013.01); *G09G 5/12* (2013.01); *G09G 2356/00* (2013.01); *G09G 2360/04* (2013.01)

(58) Field of Classification Search
CPC ..... G01S 5/30; G01S 5/18; G01S 3/48; G01S 13/06; G06F 3/0486; G06F 3/0488; G06F 3/017; G06F 3/043; G06F 3/1431; G06F 3/1446; G06F 3/04815; G06F 3/016; G06F 3/147; G06F 3/011; G06F 1/1626; H04M 2250/12; H04M 1/7253; H04M 2203/359;
(Continued)

(56) References Cited

U.S. PATENT DOCUMENTS 9,224,358 B2    12/2015 Drake et al.
10,027,795 B1 *  7/2018 Maguire ................. G08B 3/10
(Continued)

OTHER PUBLICATIONS

International Bureau, "International Preliminary Report on Patentability," issued in connection with International Patent Application No. PCT/US2017/048709, dated Feb. 25, 2020, 10 pages.
(Continued)

*Primary Examiner* — Christopher E Leiby
(74) *Attorney, Agent, or Firm* — Hanley, Flight & Zimmerman, LLC

(57) ABSTRACT

Methods, apparatus, systems, and articles of manufacture are disclosed for configuring display screen coordinates. An example apparatus includes at least one storage device or storage disk, instructions, and at least one processor to execute the instructions. When executed, the example instructions cause the at least one processor to determine whether a first position of a first display screen is within a threshold of a second position of a second display screen, and in response to determining that the first position is within the threshold of the second position, adjust a first coordinate of the first display screen relative to a second coordinate of the second display screen, the first coordinate and the second coordinate to be adjusted within a graphics properties page related to configuration of content rendering between the first display screen and the second display screen.

21 Claims, 10 Drawing Sheets

(58) Field of Classification Search
CPC .. G09G 5/12; G09G 2370/16; G09G 2360/04; G09G 2300/026; G09G 2356/00; G09G 3/002; G06T 19/006; G06T 2219/2016; G06T 2219/2021; H04N 13/279

See application file for complete search history.

(56) References Cited

U.S. PATENT DOCUMENTS

| | | | |
|---|---|---|---|
| 11,231,896 B2 | 1/2022 | Lawrence | |
| 2002/0151283 A1 | 10/2002 | Pallakoff | |
| 2005/0093868 A1 | 5/2005 | Hinckley | |
| 2010/0053164 A1 | 3/2010 | Imai et al. | |
| 2013/0050080 A1 | 2/2013 | Dahl et al. | |
| 2014/0184652 A1 | 7/2014 | Matel | |
| 2017/0147271 A1 | 5/2017 | DeLuca et al. | |
| 2017/0194706 A1* | 7/2017 | Lee | H04B 7/0619 |
| 2018/0063706 A1 | 3/2018 | Nolan et al. | |
| 2019/0027113 A1* | 1/2019 | Kaine | G06F 3/012 |
| 2020/0293257 A1 | 9/2020 | Lawrence | |
| 2023/0092764 A1* | 3/2023 | El Ferkouss | H04W 76/34 370/329 |

OTHER PUBLICATIONS

International Searching Authority, "International Search Report," issued in connection with International Patent Application No. PCT/US2017/048709, dated May 17, 2018, 3 pages.

International Searching Authority, "Written Opinion," issued in connection with International Patent Application No. PCT/US2017/048709, dated May 17, 2018, 9 pages.

United States Patent and Trademark Office, "Notice of Allowance," issued in connection with U.S. Appl. No. 16/629,164, dated Sep. 16, 2021, 15 pages.

United States Patent and Trademark Office, "Final Office Action," issued in connection with U.S. Appl. No. 16/629,164, dated Apr. 8, 2021, 24 pages.

United States Patent and Trademark Office, "Non-Final Office Action," issued in connection with U.S. Appl. No. 16/629,164, dated Sep. 30, 2020, 16 pages.

* cited by examiner

100

200

300

500

700

900

CONFIGURING DISPLAY SCREEN COORDINATES

RELATED APPLICATION

This patent arises from a continuation of U.S. patent application Ser. No. 16/629,164, (now U.S. Pat. No. 11,231,896) which was filed on Jan. 7, 2020, which is a national stage application of PCT Application Number PCT/US2017/048709, which was filed on Aug. 25, 2017. U.S. patent application Ser. No. 16/629,164 and PCT Application Number PCT/US2017/048709 are hereby incorporated herein by reference in their entireties. Priority to U.S. patent application Ser. No. 16/629,164 and PCT Application Number PCT/US2017/048709 is hereby claimed.

TECHNICAL FIELD

This disclosure relates generally to automatic screen coordinate configuration for displays.

BACKGROUND

A user may want to use a primary (main) display screen such as the display screen on a mobile device such as a cell phone as well as a secondary (extended) display screen (for example, a display screen that is less mobile in nature such as a display screen that is attached to a wall or is large, etc). In some usage models, it may be important for the two display screens to have some type of coordinate configuration between the display screens so that relative positioning between the two display screens can be determined using a common set of display coordinates. For example, a user may wish to come home with a laptop, phone or other mobile device, and the user may want to do work or check email on the mobile device while streaming video from the mobile device to a second large display screen. Relative position can be useful for a number of reasons (for example, if the user wants to drag and drop a video from the mobile device to the second display screen).

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
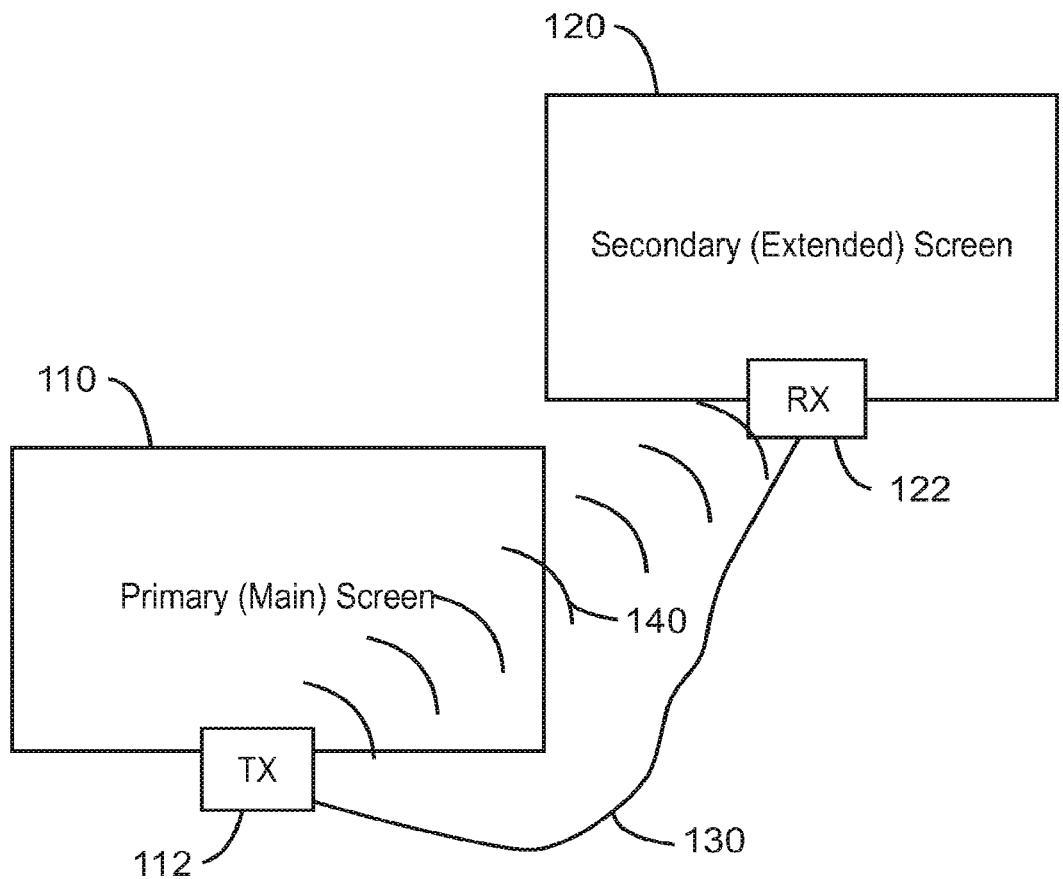
FIG. 1 illustrates a primary display screen and a secondary display screen.

This disclosure relates generally to automatic screen coordinate configuration for displays (for example, for wireless displays).

In some embodiments, wireless and wired display solutions can support configuration of extended display screens. Configuring coordinates of an extended display screen can be implemented using wired and wireless solutions.

Wireless display solutions such as, for example, Wireless Display (WiDi), Miracast, and/or Wireless Docking, etc. can provide support configuration of extended screens over the wireless link. Configuring the coordinates of an extended screen over wireless display solutions can be implemented using a manual procedure. Similarly, configuring the coordinates of an extended screen over wired solutions such as, for example, HDMI and/or DisplayPort, etc. can also be implemented using a manual procedure. In some embodiments, coordinates of an extended display screen can be configured using wireless or wired implementations.

As discussed above, a user may want to use a primary display screen (or main display screen) such as, for example, the display screen on a mobile device such as a cell phone as well as a secondary display screen (or extended display screen). An example of a secondary or extended display screen can be a display screen that is less mobile in nature such as a display screen that is attached to a wall or is large, etc. In some usage models, it may be important for the two display screens to have some type of coordinate configuration between the display screens so that relative positioning between the two display screens can be determined using a common set of display coordinates. For example, a user may wish to come home with a laptop, phone or other mobile device, and the user may want to do work or check email on the mobile device while streaming video from the mobile device to a second large display screen. Relative position can be useful for a number of reasons in various embodiments (for example, if the user wants to drag and drop a video from the mobile device to the second display screen).

In some embodiments, a directional beam, beamforming or location identification may be implemented at the transmitter (Tx) of a primary display screen to identify a location of a wireless display sink and/or receiver (Rx) of a secondary display screen, and automatically set and/or configure coordinates of the displays based on relative positions between the transmitter and the receiver.

In some embodiments, a main screen and an extended screen can be manually moved around (for example, by a user) in a variety of relative physical positions (for example, in a relative position that is desired by the user). This can be implemented for wired and/or wireless displays. During configuration and physical set up of an extended display screen, the extended (or secondary) screen may be physically positioned in an appropriate position relative to a main (or primary) display screen. In this manner, the extended screen acts as a natural extension of the main screen, and a user can move toward the extended screen to interact with it. In order to implement this arrangement, the coordinates of the extended display screen with respect to the main display screen may be appropriately configured in order to reflect the physical position of the extended screen relative to the main primary screen.

Some embodiments can be implemented in systems with integrated receivers in the display screen (for example, TVs with Miracast adapters). Some embodiments can be implemented in products where a receiver is placed close to a display screen (for example, using wireless WiGig docks). Some embodiments relate to any system where a position of a secondary display screen is determined by a position of a transmitter of one display screen relative to a receiver in a second display screen. Some embodiments relate to systems in which a receiver is located within or near a display screen that is being used as a secondary display screen.

FIG. 1 illustrates a system 100 with physical positioning of a primary display screen 110 (for, example a main display screen) and a secondary display screen 120 (for example, a secondary display screen). Primary display screen 110 includes a transmitter (TX) 112 and secondary display screen 120 includes a receiver (RX) 122. It is noted that either or both of transmitter 112 and receiver 122 can be a transceiver that includes both transmitting and receiving capabilities. In some embodiments, transmitter 112 and receiver 122 can include both wired and wireless communication capabilities. FIG. 1 illustrates a wired communication path 130 between the transmitter 112 and the receiver 122 as well as a wireless communication path between the transmitter 112 and the receiver 122. In some embodiments, a screen coordinate system of the secondary screen 120 is aligned with a screen coordinate system of the primary screen 110. In some embodiments, secondary screen 120 can be manually moved so that the secondary screen 120 forms an extension screen of the primary screen 110 based on their relative positions.

Figure 2:
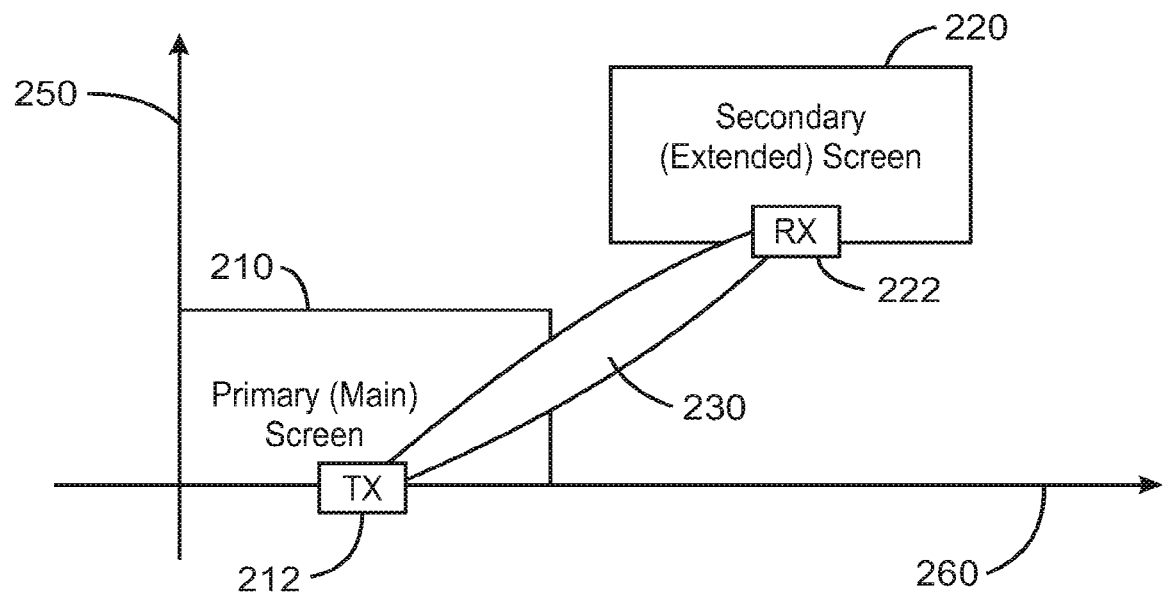
FIG. 2 illustrates a primary display screen and a secondary display screen.

FIG. 2 illustrates a system 200 with physical positioning of a primary display screen 210 (for, example a main display screen) and a secondary display screen 220 (for example, a secondary display screen). Primary display screen 210 includes a transmitter (TX) 212 and secondary display screen 220 includes a receiver (RX) 222. It is noted that either or both of transmitter 212 and receiver 222 can be a transceiver that includes both transmitting and receiving capabilities. In some embodiments, transmitter 212 and receiver 222 can include both wired and wireless communication capabilities. FIG. 2 illustrates a communication path 230 between the transmitter 212 and the receiver 222. In some embodiments, the communication path 230 can be a wireless communication path or a wired communication path. In some embodiments, the communication path 230 can include both a wireless communication path and a wired communication path. In some embodiments, a screen coordinate system of the secondary screen 220 is aligned with a screen coordinate system of the primary screen 210. In some embodiments, secondary screen 220 can be manually moved so that the secondary screen 220 forms an extension screen of the primary screen 210 based on their relative positions. Additionally, in some embodiments, a coordinate system of the secondary screen 220 can be automatically configured, set, and/or adjusted to a coordinate system of the primary display screen 210 (for example, based on a coordinate system of the primary display screen 210, where the coordinate system of the primary display screen 210 is represented, for example, by axis 250 and axis 260 illustrated in FIG. 2).

In some embodiments, automatic adjustment, setting, and/or configuring of coordinates can be made when a relative position between transmitter 212 and receiver 222 changes. For example, if one or both of primary display screen 210 and secondary display screen 220 are included in a mobile device such as a phone, a tablet, a laptop, or some other mobile device and the user moves that device from one positon to another relative to the other display, automatic adjustment, setting, and/or configuring of coordinates can be implemented. In some embodiments, the primary display screen 210 is part of a mobile device.

In some embodiments, a communications capability of communication path 230 can include use of a directional beam, beamforming, antenna beam, or some other communication capability that helps to enable determination of relative positions of a transmitting and receiving device at each end of the communication path. Directional beam use such as beamforming is available using various implementations (for example, in IEEE 802.11ac between Access Points AP and stations, as well as via WiGig or Wireless Gigabit Alliance). In some embodiments, an antenna beam can be directed between the transmitter and the receiver (for example, using IEEE 802.11ac or WiGig implementations). This can help to identify a relative location of the screen to which the receiver (or sink) is connected relative to the transmitter. In some embodiments, other location based mechanisms may be used.

In some embodiments, once the relative location is identified, the directional information may be provided (for example, to an OS or operating system, or to a graphics driver). This information can be used to make suitable configuration adjustments and set the coordinate system of the extended screen to one that corresponds to the relative direction of the received connected to the secondary extended screen relative to the transmitter. In some embodiments, a driver (for example, a WiFi driver) can give directional information to an operating system (OS) or to a graphics driver, for example.

Figure 3:
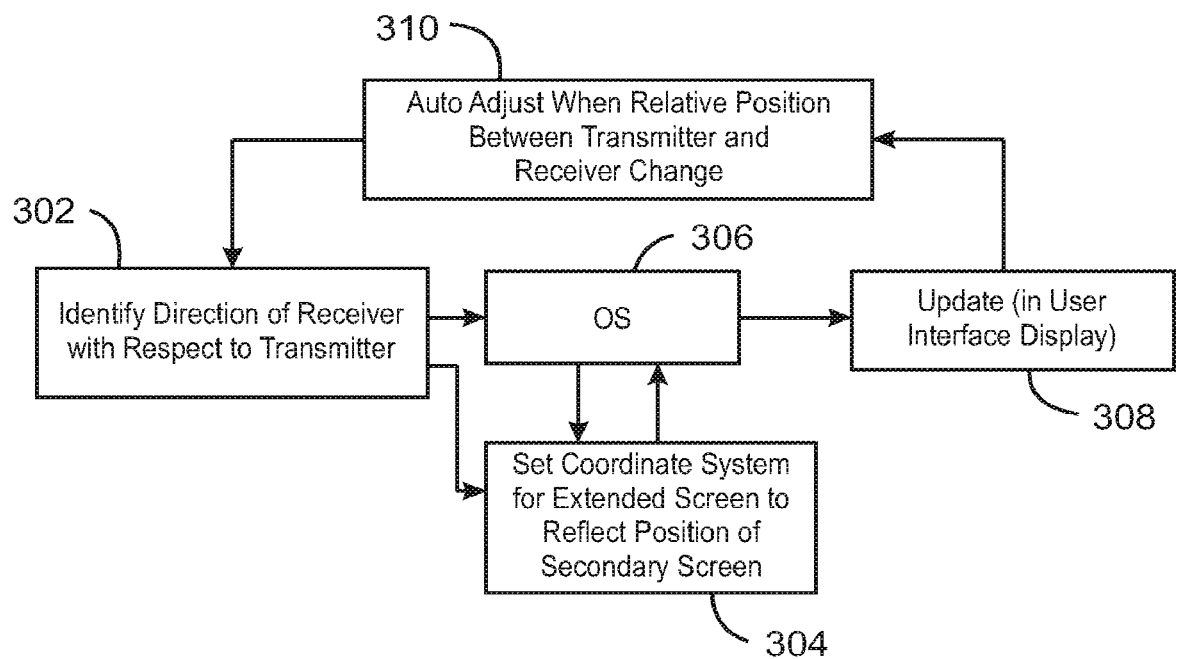
FIG. 3 illustrates automatic coordinate setting and/or configuration of display screens.
Figure 4:
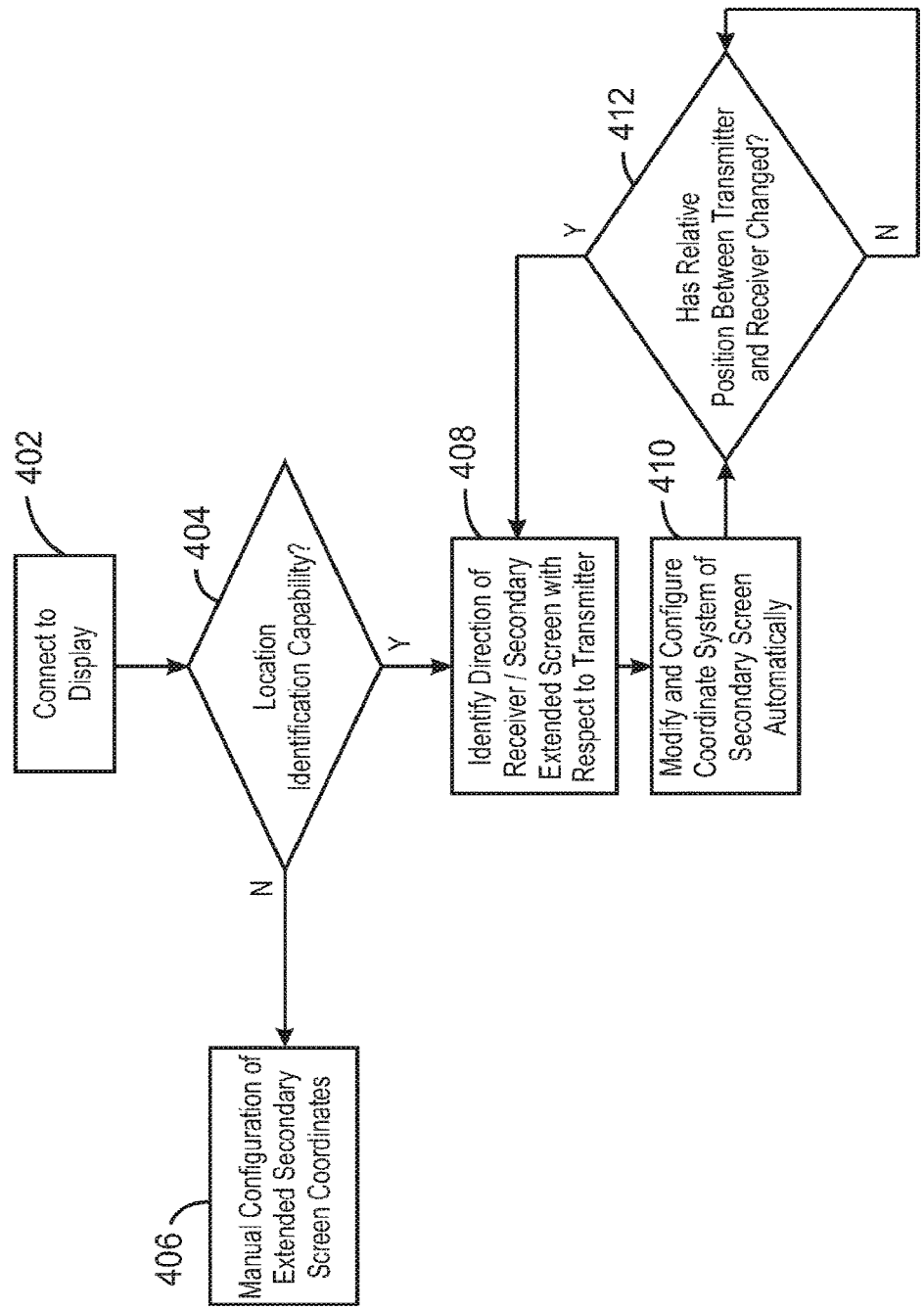
FIG. 4 illustrates automatic coordinate setting and/or configuration of display screens.

FIG. 3 and FIG. 4 illustrate automatic adjustment, setting and/or configuring of coordinates when a relative position between transmitter and receiver changes according to some embodiments. As discussed above, automatic adjustment, setting, and/or configuring of display coordinates can be used in transmitter or receiver implementations including display screens of a mobile device (for example, a phone, a tablet, a laptop, a wearable device, or other devices with a display screen). In some embodiments, automatic adjustment, setting, and/or configuring of display coordinates can be applied to any situation where two display screens move in position relative to one another, either by a user moving one of the display screen devices, or one of the display screen devices being moved relative to the other display screen device in any manner).

In some embodiments, FIG. 3 or FIG. 4 can illustrate use of a display transmitter (for example, a wireless display transmitter) or a display receiver (for example, a wireless display receiver) that can be used to help implement automatic coordinate system setting, adjusting, and/or configuring for extended secondary screens using, for example, directional beam, beamforming, antenna beam, or location identification. In some embodiments, beamforming can identify a direction of a receiver with respect to the transmitter (for example, using a WiFi driver). In some embodiments, the coordinate system for the extended (secondary) screen is set to reflect the position of the extended (secondary) screen (for example, using a graphics driver). In some embodiments, when a relative position between the transmitter and receiver changes, an auto adjustment of the coordinate system of the extended secondary screen is made.

In some embodiments, FIG. 3 or FIG. 4 can illustrates automatic configuration of coordinate systems of extended secondary display screens.

FIG. 3 illustrates a flow 300 for automatic coordinate setting, adjusting, and/or configuring of display screens. In some embodiments, some of all of flow 300 can be implemented in or in conjunction with a display transmitter, display receiver, display transceiver, etc. In some embodiments, for example, all of some of flow 300 can be implemented in or in conjunction with a wireless display transmitter, wireless display receiver, wireless display transceiver, etc. In some embodiments, flow 300 can be implemented in a wireless driver, a graphics driver, an operating system, and/or in a transmitter, receiver, and/or transceiver. At box 302 a direction (or position) of a receiver (for example, a receiver of a display screen such as a primary display screen or main display screen of a first device) relative to a position of a transmitter (for example, a transmitter of a secondary display screen or an extended display screen of a second device). For example, in some embodiments, box 302 may be implemented by a driver such as a WiFi driver. In some embodiments, box 302 may be implemented using location identification such as use of directional beam, beamforming, antenna beam, or other relative location identification. In some embodiments, box 304 can set a coordinate system for a display screen such as, for example, a secondary display screen or an extended display screen to reflect a position of that screen (for example, relative to another display screen such as a primary display screen or a main display screen). In some embodiments, box 304 can be implemented using, for example, a graphics driver. In some embodiments, an operating system (OS) 306 can receive the identified direction from box 302 and the set coordinate system from box 304. In some embodiments, the identified direction information can be sent from box 302 to box 304 via the OS 306. At box 308, a user interface for a user can be updated. For example, any coordinate system settings or changes can be updated in a graphics properties page at box 308. At box 310, a coordinate system (for example, a coordinate system of a secondary display screen) can be automatically adjusted, set, and/or configured when a relative position between a transmitter of a primary (main) display screen and a receiver of a secondary (extended) display screen changes.

FIG. 4 illustrates a flow 400 for automatic coordinate setting, adjusting, and/or configuring of display screens. At box 402 a connection (for example, a wireless connection) can be made to a display (for example, to a wireless display). At box 404, a determination is made as to whether there is a capability of determining location (for example, relative location of a transmitter of a first display screen and a receiver of a second display screen). For example, in some embodiments, box 404 determines whether a device such as a transmitter, receiver, NIC (network interface card or network interface controller) and/or driver, for example, is capable of use of a directional beam, beamforming or other location identification. If there is not a capability of determining location (for example, using beamforming or location identification) at box 404, an indication can be provided at box 406 that a manual configuration of extended (secondary) screen coordinates should be implemented, for example. If there is a capability of determining location (for example, using a directional beam, beamforming or location identification) at box 404, a direction of a receiver (for example, of a display screen such as a secondary extended screen) with respect to the transmitter (for example, of a display screen such as a primary main screen) is identified at box 408. The coordinate system of the secondary screen is then modified and/or configured (for example, automatically modified and/or configured) at box 410. When the relative position between the transmitter and receiver changes at box 412, the direction of the receiver and/or secondary extended screen relative to the transmitter is again identified at box 408, and the coordinate system of the secondary screen is again automatically modified and/or configured at box 410.

Figure 5:
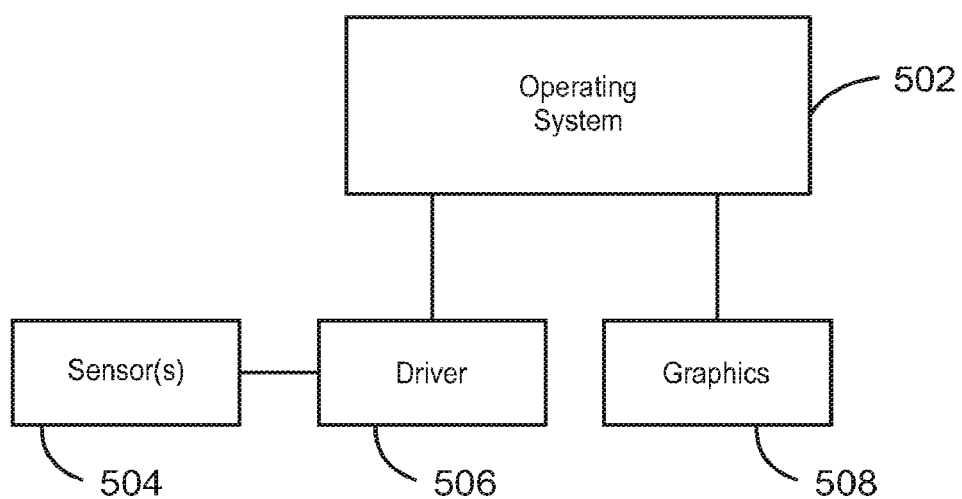
FIG. 5 illustrates a computing system for automatic display screen coordinate setting and/or configuration.

FIG. 5 illustrates a computing system 500 for automatic display (and/or display screen) coordinate setting, adjusting, and/or configuring. System 500 includes an Operating System (OS) 502, one or more sensors 504, a driver (for example, a wireless driver) 506, and graphics (for example, graphics driver) 508. In some embodiments, OS 502 is responsive to user input. In some embodiments, OS 502 can be used as an interface to enable and/or create a connection with one or more display (for example, including a display such as a primary or main display, and/or including a display such as a secondary or extended display). In some embodiments, OS 502 can be used as an interface to enable and/or create a connection with one or more display screen (for example, including a display screen such as a primary or main display screen, and/or including a display screen such as a secondary or extended display screen). In some embodiments, OS 502 can adjust a coordinate system of one or more displays and/or one or more display screens. Sensor(s) 504 can include, for example, one or more accelerometers, one or more gyroscopes, and/or one or more other sensing devices. In some embodiments, sensor(s) 504 are used to detect user motion. In some embodiments, sensor(s) 504 are used to detect motion of one or more display and/or one or more display screen, for example. In some embodiments, driver 504 received input from sensor(s) 502 and tracks relative changes in position between a display (and/or display screen) and a computing device, and/or tracks relative changes in position between two displays (and/or display screens) such as a secondary display (and/or secondary display screen) and a primary display (and/or primary display screen). In some embodiments, driver 504 is a wireless driver (for example, a wireless driver using beamforming). In some embodiments, driver 504 provides the tracked relative changes in position to the OS 502. In some embodiments, graphics 508 include a graphics driver. Graphics 508 can create a buffer for one or more display, create a coordinate system for one or more display, and/or render content on one or more display. In some embodiments, graphics 508 can create a buffer for one or more primary display, create a coordinate system for one or more primary display, and/or render content on one or more primary display. In some embodiments, graphics 508 can create a buffer for one or more secondary display, create a coordinate system for one or more secondary display, and/or render content on one or more secondary display. In some embodiments, graphics 508 can create a buffer for one or more primary display and a buffer for one or more secondary display, create a coordinate system for one or more primary display and a coordinate system for one or more secondary display, and/or render content on one or more primary display and render content on one or more secondary display. In some embodiments, one or more display can be configured (for example, one or more set of display screen coordinates can be configured) by graphics 508 in response to OS 502. In some embodiments, graphics 508 can provide update information regarding one or more display to OS 502. In some embodiments, graphics 508 can provide updates to OS 502 relating to adjustment of display screen coordinates. In some embodiments, system 500 can be used to implement display (and/or display screen) coordinate setting, adjustment, configuration, etc. as described anywhere in this specification and/or in the drawings. For example, in some embodiments, system 500 can implement all or a portion of any display coordinate system setting, adjusting, and/or configuring as illustrated in FIG. 4 and/or described in this specification in reference to FIG. 4.

Figure 6:
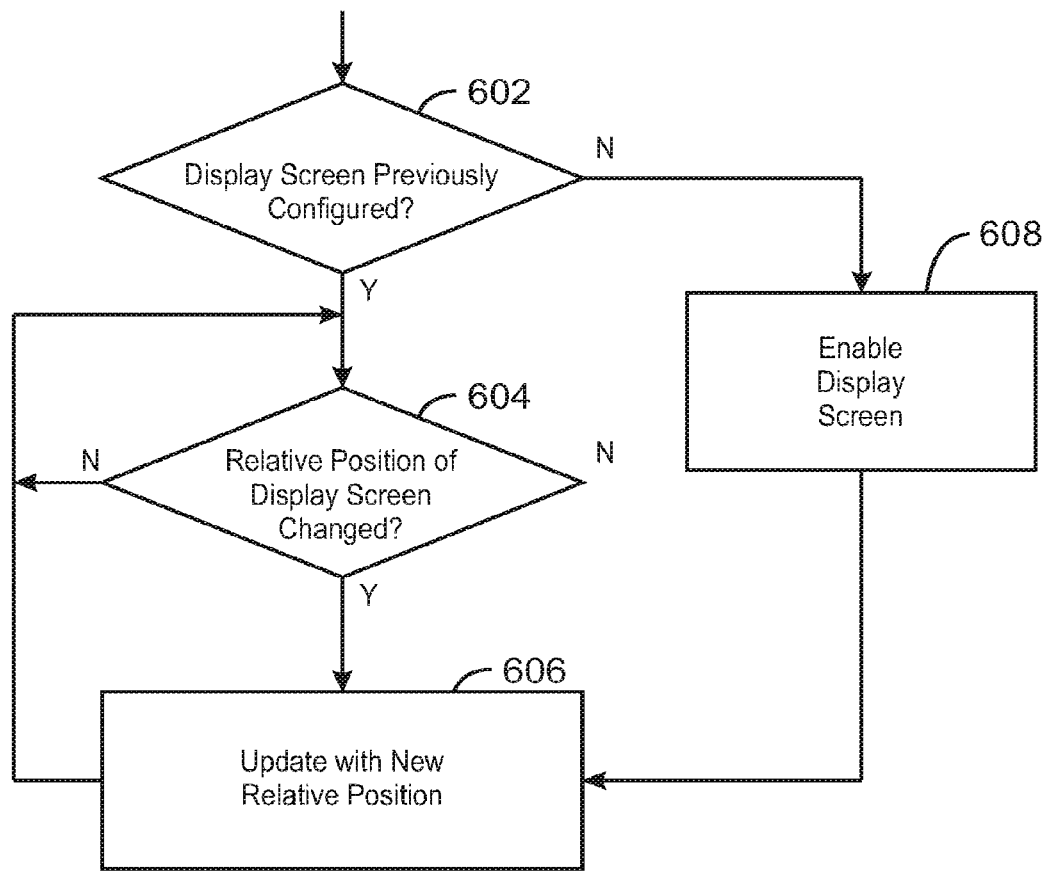
FIG. 6 illustrates automatic display screen coordinate setting and/or configuration.

FIG. 6 illustrates automatic display (and/or automatic display screen) coordinate setting, adjusting, and/or configuring 600. In some embodiments, FIG. 6 illustrates automatic display (and/or automatic display screen) coordinate setting, adjusting, and/or configuring. In some embodiments, FIG. 6 illustrates automatic secondary display (and/or automatic secondary display screen) coordinate setting, adjusting, and/or configuring 600. In some embodiments, all or a portion of the display (and/or display screen) setting, adjusting, and/or configuring 600 can be implemented by system 500, for example. At 602, a determination is made as to whether a display (and/or a display screen) has previously been configured. If the display has been previously configured at 602, a determination is made at 604 as to whether a relative position of the display (and/or display screen) has changed. If the relative position has been changed at 604, an update is made at 606 with the new relative position. If the display has not been previously configured at 602, the display (and/or display screen) is enabled at 608, and an update is made at 606 with the relative position of the display (and/or display screen) (for example, an update of the position of the display and/or display screen relative to another display and/or display screen, and/or relative to a computing device such as a computing device with another display and/or display screen). In some embodiments, the update at 606 is an update of the position of a secondary (or extended) display and/or secondary (or extended) display screen relative to a primary (or main) display and/or primary (and/or main) display screen.

In some embodiments (for example, in some embodiments of FIG. 6), if a user has not previously configured a display (and/or display screen) such as a secondary or extended display or display screen, a user can enable the display and/or display screen (for example, in box 608 of FIG. 6). In some embodiments, this enablement may be used in implementations where the display or display screen is being used as a duplicate monitor (for example, as a duplicate monitor intended to display identical information as another display and/or display screen), and/or as an extended monitor (for example, as an extended monitor intended to display information across the display and/or display screen as well as another display or display screen), for example. In some embodiments, this enablement may be used in implementations where the display or display screen is being used as a monitor to display information related to information controlled by a user using a user interface displayed on another display or display screen (for example, a movie being displayed on a secondary display screen that is controller using an interface displayed on a first display screen), for example.

In some embodiments, once a user enables a display and/or display screen (for example, in some embodiments, at box 608 of FIG. 6), an auto position determination can be made as described anywhere herein that can position the display or display screen relative to a default position that is used in the user enablement, for example. In some embodiments, this can be implemented, for example, at box 606 of FIG. 6.

In some embodiments, if a user has previously connected a display and/or display screen, but the display or display screen is in a different relative position (for example, in a different relative position to another display and/or display screen and/or in a different relative position to a computing device), the act of connecting the display and/or display screen (for example, the enabling of the display and/or display screen at box 608) will lead to a positioning of the display and/or display screen in an actual new position with respect to another display and/or display screen, a computing device, and/or a user such as a user holding a display, display screen, and/or a computing device, for example. This is implemented in some embodiments, for example, at box 606 of FIG. 6. If another display and/or display screen, computing device, and/or user, etc. moves when the display and/or display screen is enabled, connected, etc., then a screen position can be updated (for example, configured, adjusted, set, etc. in a display coordinate system) based on the relative position.

In some embodiments, an auto connect can be implemented if another display and/or display screen, computing device, and/or user, etc. is within a certain proximity of the display and/or display screen (for example, a primary display and/or display screen is within a certain proximity of a secondary display and/or display screen).

In some embodiments, while two dimensional proximity is illustrated herein, it is noted that three dimensional proximity may be implemented in some embodiments. In some embodiments, relative position can be implemented based on rotational position instead of or in addition to two or three dimensional positioning.

In some embodiments, a display and/or display screen can be unpaired with a system. For example, in response to a user input and/or in response to a lack of proximity (for example, within a threshold) of the display and/or display screen with another display and/or display screen, a computing device, and/or a user, etc., the display and/or display screen is disabled and/or no longer paired with the other display and/or display screen, computing device, and/or user, etc.

Figure 7:
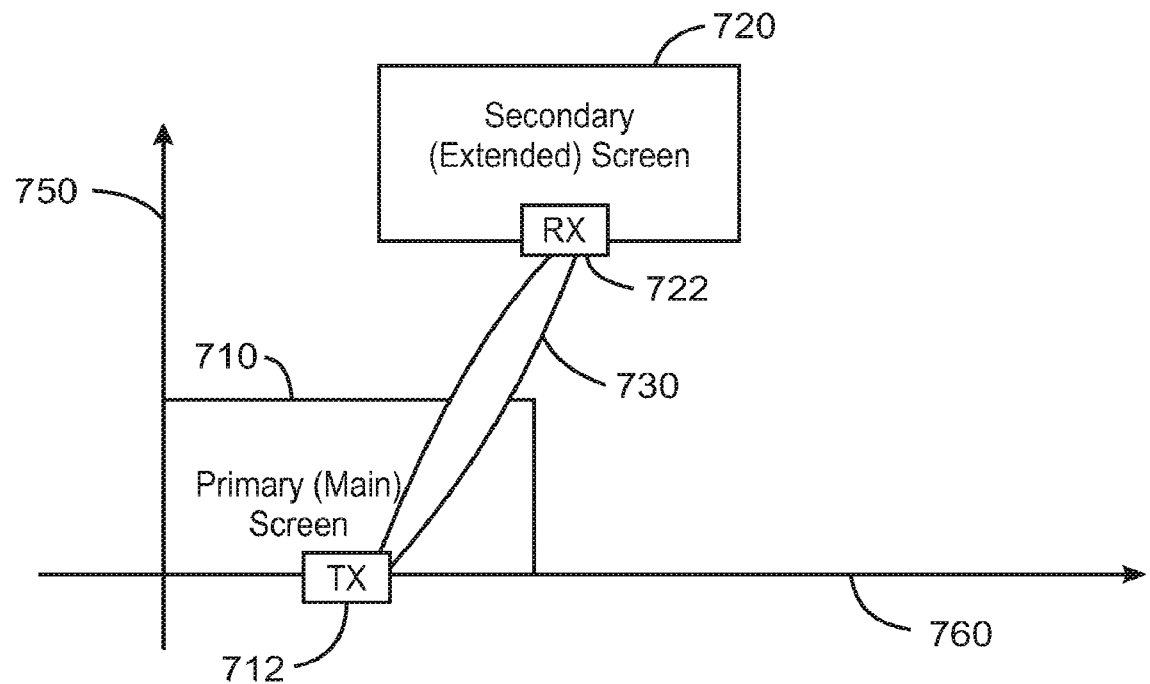
FIG. 7 illustrates a primary display screen and a secondary display screen.
Figure 8:
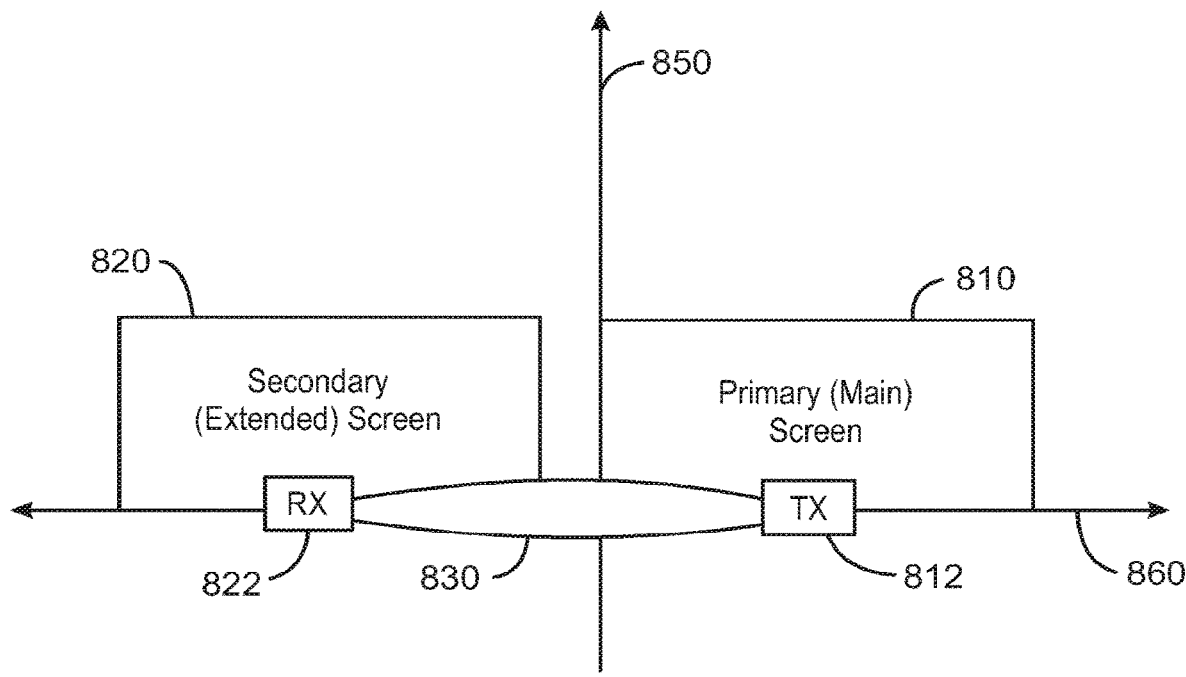
FIG. 8 illustrates a primary display screen and a secondary display screen.

FIG. 7 and FIG. 8 illustrate different relative positions between transmitters (Tx) and receivers (Rx) of display screens similar to that illustrated in FIG. 2 but with different relative positions of the display screens.

FIG. 7 illustrates a system 700 with physical positioning of a primary display screen 710 (for, example a main display screen) and a secondary display screen 720 (for example, an external display screen). Primary display screen 710 includes a transmitter (TX) 712 and secondary display screen 720 includes a receiver (RX) 722. It is noted that either or both of transmitter 712 and receiver 722 can be a transceiver that includes both transmitting and receiving capabilities. In some embodiments, transmitter 712 and receiver 722 can include both wired and wireless communication capabilities. FIG. 7 illustrates a communication path 730 between the transmitter 712 and the receiver 722. In some embodiments, the communication path 730 can be a wireless communication path or a wired communication path. In some embodiments, the communication path 730 can include both a wireless communication path and a wired communication path. In some embodiments, a screen coordinate system of the secondary screen 720 is aligned with a screen coordinate system of the primary screen 710. In some embodiments, secondary screen 720 can be manually moved so that the secondary screen 720 forms an extension screen of the primary screen 710 based on their relative positions. Additionally, in some embodiments, a coordinate system of the secondary screen 720 can be automatically adjusted to a coordinate system of the primary display screen 710 (for example, based on a coordinate system of the primary display screen 710, where the coordinate system of the primary display screen 710 is represented, for example, by axis 750 and axis 760 illustrated in FIG. 7).

In some embodiments, automatic adjustment, setting, and/or configuring of coordinates can be made when a relative position between transmitter 712 and receiver 722 changes. For example, if one or both of primary display screen 710 and secondary display screen 720 are included in a mobile device such as a phone, a tablet, a laptop, or some other mobile device and the user moves that device from one positon to another relative to the other display, automatic adjustment, configuring, and/or setting of coordinates can be implemented. In some embodiments, the primary display screen 710 is part of a mobile device.

In some embodiments, a communications capability of communication path 730 can include using a directional beam, beamforming, antenna beam, or some other communication capability that helps to enable determination of relative positions of a transmitting and receiving device at each end of the communication path. This can help to identify a relative location of the screen to which the receiver (or sink) is connected relative to the transmitter. In some embodiments, other location based mechanisms may be used.

FIG. 8 illustrates a system 800 with physical positioning of a primary display screen 610 (for, example a main display screen) and a secondary display screen 620 (for example, an extended display screen). Primary display screen 810 includes a transmitter (TX) 812 and secondary display screen 820 includes a receiver (RX) 822. It is noted that either or both of transmitter 812 and receiver 822 can be a transceiver that includes both transmitting and receiving capabilities. In some embodiments, transmitter 812 and receiver 822 can include both wired and wireless communication capabilities. FIG. 8 illustrates a communication path 830 between the transmitter 812 and the receiver 822. In some embodiments, the communication path 830 can be a wireless communication path or a wired communication path. In some embodiments, the communication path 830 can include both a wireless communication path and a wired communication path. In some embodiments, a screen coordinate system of the secondary screen 820 is aligned with a screen coordinate system of the primary screen 810. In some embodiments, secondary screen 820 can be manually moved so that the secondary screen 820 forms an extension screen of the primary screen 810 based on their relative positions. Additionally, in some embodiments, a coordinate system of the secondary screen 820 can be automatically adjusted, set, and/or configured to a coordinate system of the primary display screen 810 (for example, based on a coordinate system of the primary display screen 810, where the coordinate system of the primary display screen 810 is represented, for example, by axis 850 and axis 860 illustrated in FIG. 8).

In some embodiments, automatic adjustment, setting, and/or configuring of coordinates can be made when a relative position between transmitter 812 and receiver 822 changes. For example, if one or both of primary display screen 810 and secondary display screen 820 are included in a mobile device such as a phone, a tablet, a laptop, or some other mobile device and the user moves that device from one positon to another relative to the other display, automatic adjustment, setting, and/or configuring of coordinates can be implemented. In some embodiments, the primary display screen 810 is part of a mobile device.

In some embodiments, a communications capability of communication path 830 can include a directional beam, beamforming, antenna beam, or some other communication capability that helps to enable determination of relative positions of a transmitting and receiving device at each end of the communication path. This can help to identify a relative location of the screen to which the receiver (or sink) is connected relative to the transmitter. In some embodiments, other location based mechanisms may be used.

Some embodiments implement automatic configuration, adjustment, and/or setting of display coordinates. In some embodiments, relative display coordinates can be automatically adjusted, set, and/or configured based on direction information without any manual adjustment.

Figure 9:
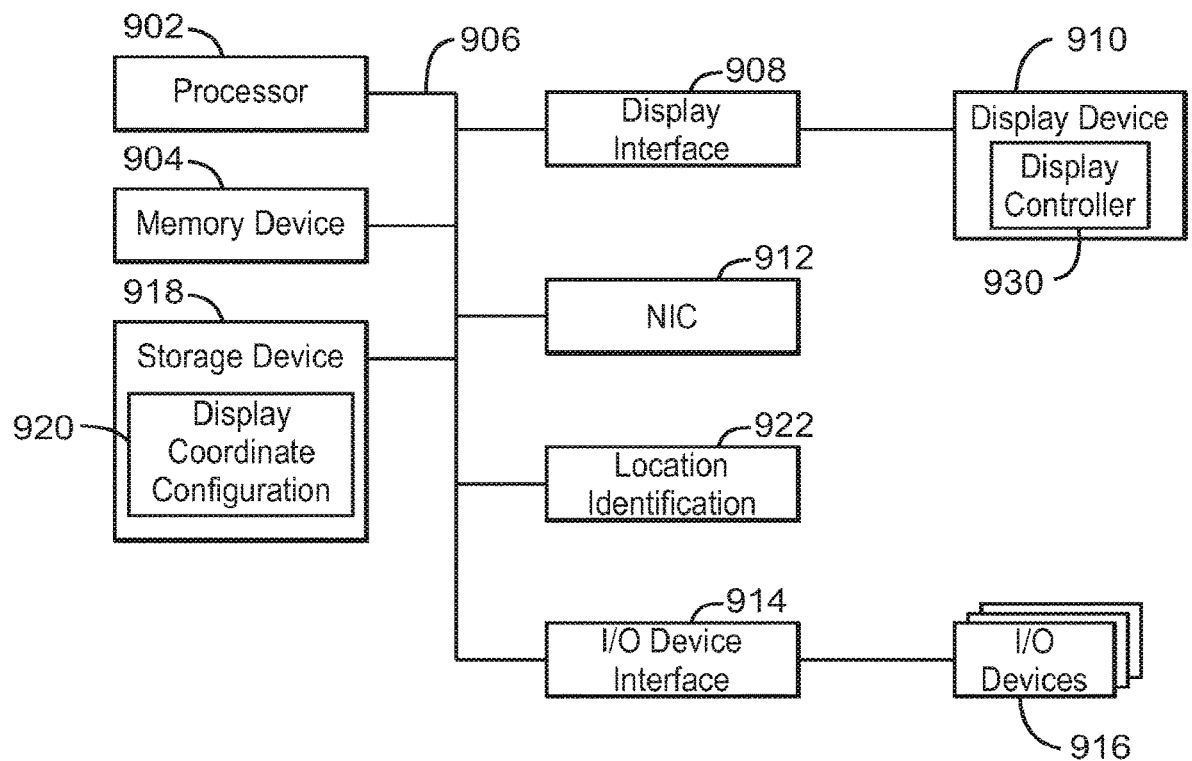
FIG. 9 illustrates a computing system.

FIG. 9 is a block diagram of an example of a computing device 900. In some embodiments, computing device 900 can include display features including one or more of relative display positioning, display coordinate configuration, display coordinate setting, display coordinate adjustment, and/or other display features discussed herein according to some embodiments. The computing device 900 may be, for example, a mobile device, laptop computer, notebook, tablet, all in one, 2 in 1, and/or desktop computer, etc., among others. The computing device 900 may include a processor 902 that is adapted to execute stored instructions, as well as a memory device 904 (and/or storage device 904) that stores instructions that are executable by the processor 902. The processor 902 can be a single core processor, a multi-core processor, a computing cluster, or any number of other configurations. For example, processor 902 can be an Intel® processor such as an Intel® Celeron, Pentium, Core, Core i3, Core i5, or Core i7 processor. In some embodiments, processor 902 can be an Intel® x86 based processor. In some embodiments, processor 902 can be an ARM based processor. The memory device 904 can be a memory device and/or a storage device, and can include volatile storage, non-volatile storage, random access memory, read only memory, flash memory, and/or any other suitable memory and/or storage systems. The instructions that are executed by the processor 902 may also be used to implement features described in this specification, including display coordinate configuration, display coordinate setting, and/or display coordinate adjustment, for example.

The processor 902 may also be linked through a system interconnect 906 (e.g., PCI®, PCI-Express®, NuBus, etc.) to a display interface 908 adapted to connect the computing device 900 to a display device 910. In some embodiments, display device 910 can include any display screen as described or illustrated herein. For example, display device 910 can also include a transmitter, receiver, or transceiver as described or illustrated herein. The display device 910 may include a display screen that is a built-in component of the computing device 900. The display device 910 may also include a computer monitor, television, or projector, among others, that is externally connected to the computing device 900. The display device 910 can include liquid crystal display (LCD), light emitting diodes (LEDs), organic light emitting diodes (OLEDs), and/or micro-LEDs (μLEDs), among others. In some embodiments, computing device 900 can include a second display device in addition to the display device 910. In some embodiments, the second display device can be the same as or similar to display device 910. In some embodiments, the second display device can be coupled to the interconnect 906 via a display interface the same as or similar to display interface 908. In some embodiments, display device 910 can be and/or can include a primary screen (or a main screen) the same as or similar to other primary (or main) screens described herein, and the second display device can be a secondary screen (or extended screen) the same as or similar to other secondary (or extended) screens described herein. In some embodiments, the second display device can be and/or can include a primary screen (or a main screen) the same as or similar to other primary (or main) screens described herein, and the display device 910 can be a secondary screen (or extended screen) the same as or similar to other secondary (or extended) screens described herein.

In some embodiments, the display interface 908 can include any suitable graphics processing unit, transmitter, port, physical interconnect, and the like. In some examples, the display interface 908 can implement any suitable protocol for transmitting data to the display device 910. For example, the display interface 908 can transmit data using a high-definition multimedia interface (HDMI) protocol, a DisplayPort protocol, or some other protocol or communication link, and the like In some embodiments, display device 910 includes a display controller 930. In some embodiments, the display controller 930 can provide control signals within and/or to the display device 910. In some embodiments, display controller 930 can be included in the display interface 908 (and/or instead of the display interface 908). In some embodiments, display controller 930 can be coupled between the display interface 908 and the display device 910. In some embodiments, the display controller 930 can be coupled between the display interface 908 and the interconnect 906. In some embodiments, the display controller 930 can be included in the processor 902. In some embodiments, display controller 930 can implement display coordinate configuration, display coordinate setting, and/or display coordinate adjustment according to any of the examples illustrated in any of the drawings and/or as described anywhere herein.

In some embodiments, any of the techniques described in this specification can be implemented entirely or partially within the display device 910. In some embodiments, any of the techniques described in this specification can be implemented entirely or partially within the display controller 930. In some embodiments, any of the techniques described in this specification can be implemented entirely or partially within the processor 902.

In addition, a network interface controller (also referred to herein as a NIC) 912 may be adapted to connect the computing device 900 through the system interconnect 906 to a network (not depicted). The network (not depicted) may be a wireless network, a wired network, cellular network, a radio network, a wide area network (WAN), a local area network (LAN), a global position satellite (GPS) network, and/or the Internet, among others. In some embodiments, any of the functionality disclosed herein such as display coordinate configuration, display coordinate setting, and/or display coordinate adjustment can be implemented in the NIC 912. In some embodiments, any of the location identification can be implemented in the NIC 912.

The processor 902 may be connected through system interconnect 906 to an input/output (I/O) device interface 914 adapted to connect the computing host device 900 to one or more I/O devices 916. The I/O devices 916 may include, for example, a keyboard and a pointing device, where the pointing device may include a touchpad or a touchscreen, among others. The I/O devices 916 may be built-in components of the computing device 900, or may be devices that are externally connected to the computing device 900.

In some embodiments, the processor 902 may also be linked through the system interconnect 906 to a storage device 918 that can include a hard drive, a solid state drive (SSD), a magnetic drive, an optical drive, a portable drive, a flash drive, a Universal Serial Bus (USB) flash drive, an array of drives, and/or any other type of storage, including combinations thereof. In some embodiments, the storage device 918 can include any suitable applications. In some embodiments, the storage device 918 can include a basic input/output system (BIOS). In some embodiments, the storage device 918 can include any device or software, instructions, etc. that can be used (for example, by a processor such as processor 902) to implement any of the functionality described herein such as display coordinate configuration, display coordinate setting, and/or display coordinate adjustment, etc.

In some embodiments, location identification 922 is used to provide location identification as described herein (for example, using beam direction, beamforming, or other location identification). In some embodiments, any of the location identification described herein can be implemented in the location identification 922. For example, any of the transmitters, receivers, and/or transceivers discussed herein can be included in either NIC 912 and/or location identification 922. In some embodiments, location identification 922 can be included in one or more of display interface 908, display device 910 (and/or the second display device), display controller 930, and/or stored in storage device 918.

It is to be understood that the block diagram of FIG. 9 is not intended to indicate that the computing device 900 is to include all of the components shown in FIG. 9. Rather, the computing device 900 can include fewer and/or additional components not illustrated in FIG. 9 (e.g., additional memory components, embedded controllers, additional modules, additional network interfaces, etc.). Furthermore, any of the functionalities of the BIOS that can be included in storage device 918 may be partially, or entirely, implemented in hardware and/or in the processor 902. For example, the functionality may be implemented with an application specific integrated circuit, logic implemented in an embedded controller, or in logic implemented in the processor 902, among others. In some embodiments, the functionalities of the BIOS can be implemented with logic, wherein the logic, as referred to herein, can include any suitable hardware (e.g., a processor, among others), software (e.g., an application, among others), firmware, or any suitable combination of hardware, software, and firmware.

Figure 10:
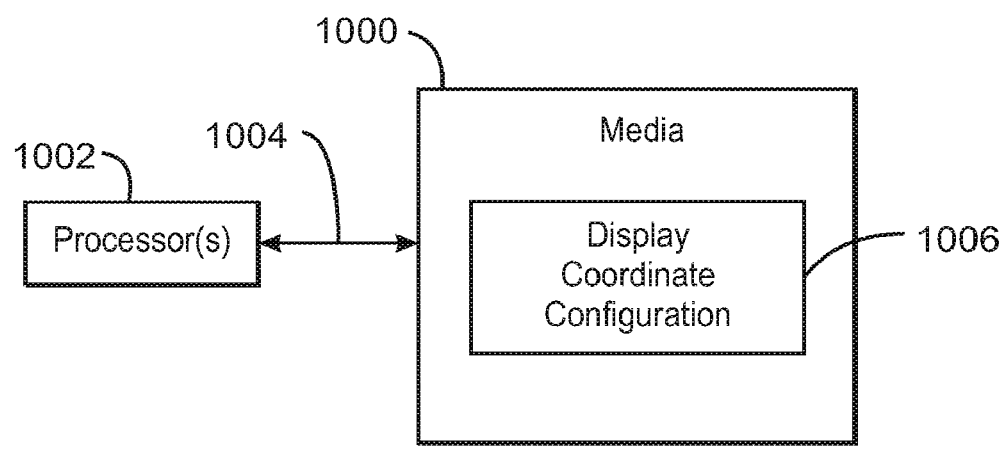
FIG. 10 illustrates one or more processors and one or more tangible, non-transitory, computer-readable media.

FIG. 10 is a block diagram of an example of one or more processor and one or more tangible, non-transitory computer readable media. The one or more tangible, non-transitory, computer-readable media 1000 may be accessed by a processor or processors 1002 over a computer interconnect 1004. Furthermore, the one or more tangible, non-transitory, computer-readable media 1000 may include code to direct the processor 1002 to perform operations as described herein. For example, in some embodiments, computer-readable media 1000 may include code to direct the processor to perform automatic display coordinate configuration 1006 (for example, display coordinate setting and/or display coordinate adjustment) according to some embodiments. In some embodiments, processor 1002 is one or more processors. In some embodiments, processor 1002 can perform similarly to (and/or the same as) processor 902 of FIG. 9, and/or can perform some or all of the same functions as can be performed by processor 902.

Various components discussed in this specification may be implemented using software components. These software components may be stored on the one or more tangible, non-transitory, computer-readable media 1000, as indicated in FIG. 10. For example, software components including, for example, computer readable instructions implementing automatic display coordinate configuration 1006 may be included in one or more computer readable media 1000 according to some embodiments. Display coordinate configuration 1006 may be adapted to direct the processor 1002 to perform one or more of any of the operations described in this specification and/or in reference to the drawings.

It is to be understood that any suitable number of software components may be included within the one or more tangible, non-transitory computer-readable media 1000. Furthermore, any number of additional software components not shown in FIG. 10 may be included within the one or more tangible, non-transitory, computer-readable media 1000, depending on the specific application.

Embodiments have been described herein as using, for example, directional beam, beamforming, antenna beam, location identification, or some other communication capability that helps to enable determination of relative positions. However, it is noted that in some embodiments, any capability may be used to determine relative locations of display screens in some embodiments. For example, in some embodiments, any method may be used, including gaze detection of a user, for example.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

EXAMPLE 1 In some examples, a system for display screen configuration can include storage to store instructions, and one or more processor to execute the instructions to identify a relative position between a first display screen and a second display screen, and to automatically adjust one or more coordinates of one or more of the first display screen and the second display screen in response to the identified relative position.

EXAMPLE 2 In some examples of EXAMPLE 1, the system can include a communication device to provide input to the one or more processor to identify the relative position.

EXAMPLE 3 In some examples of EXAMPLE 2, the communication device can be able to provide input to the one or more processor to identify the relative position using beamforming.

EXAMPLE 4 In some examples of EXAMPLE 2, the communication device can be able to provide input to the one or more processor to identify the relative position using location identification.

EXAMPLE 5 In some examples of EXAMPLE 1, the first display screen is a primary display screen and the second display screen is a secondary display screen.

EXAMPLE 6 In some examples of EXAMPLE 1, the one or more processor is able to identify a change in the relative position of the first display screen and the second display screen, and automatically modify and configure a coordinate system of the second display screen in response to the change in the relative position between the first display screen and the second display screen.

EXAMPLE 7 In some examples, a method of display screen configuration includes identifying a relative position between a first display screen and a second display screen, and automatically adjusting one or more coordinates of the second display screen in response to the relative position.

EXAMPLE 8 In some examples of EXAMPLE 7, the method includes identifying the relative position using beamforming.

EXAMPLE 9 In some examples of EXAMPLE 7, the method includes identifying the relative position using location identification.

EXAMPLE 10 In some examples of EXAMPLE 7, the method includes identifying a direction of the second display screen from the first display screen.

EXAMPLE 11 In some examples of EXAMPLE 7, the method includes identifying a change in the relative position of the first display screen and the second display screen, and automatically modifying and configuring a coordinate system of the second display screen in response to the change in the relative position between the first display screen and the second display screen.

EXAMPLE 12 In some examples of EXAMPLE 7, the first display screen is a primary display screen and the second display screen is a secondary display screen.

EXAMPLE 13 In some examples, a non-transitory computer-readable medium for display screen configuration includes a plurality of instructions that in response to being executed by one or more processor, cause the one or more processor to identify a relative position between a first display screen and a second display screen, and to automatically adjust one or more coordinates of the second display screen in response to the relative position.

EXAMPLE 14 In some examples of EXAMPLE 13, the non-transitory computer-readable medium for display screen configuration includes a plurality of instructions that in response to being executed by one or more processor, cause the one or more processor to identify the relative position using beamforming.

EXAMPLE 15 In some examples of EXAMPLE 13, the non-transitory computer-readable medium for display screen configuration includes a plurality of instructions that in response to being executed by one or more processor, cause the one or more processor to identify the relative position using location identification.

EXAMPLE 16 In some examples of EXAMPLE 13, the non-transitory computer-readable medium for display screen configuration includes a plurality of instructions that in response to being executed by one or more processor, cause the one or more processor to identify a direction of the second display screen from the first display screen.

EXAMPLE 17 In some examples of EXAMPLE 13, the non-transitory computer-readable medium for display screen configuration includes a plurality of instructions that in response to being executed by one or more processor, cause the one or more processor to identify a change in the relative position of the first display screen and the second display screen, and to automatically modify and configure a coordinate system of the second display screen in response to the change in the relative position between the first display screen and the second display screen.

EXAMPLE 18 In some examples of EXAMPLE 13, the first display screen is a primary display screen and the second display screen is a secondary display screen.

EXAMPLE 19 In some examples, a system for display screen configuration includes a transmission device, storage to store instructions, and one or more processor. The transmission device is associated with a display screen. The transmission device is to determine a relative position of the transmission device to a second transmission device associated with a second display screen. The transmission device is also to identify a relative position between the transmission device and the second transmission device. The one or more processor is to execute the stored instructions to automatically adjust one or more relative coordinates of the display screen and the second display screen in response to the relative position.

EXAMPLE 20 In some examples of EXAMPLE 19, the transmission device includes a transmitter and the second transmission device includes a receiver.

EXAMPLE 21 In some examples of EXAMPLE 19, the transmission device is to determine the relative position using a directional beam, beamforming, an antenna beam and/or location identification.

EXAMPLE 22 In some examples of EXAMPLE 19, the transmission device is to determine a direction of the second display screen from the first display screen.

EXAMPLE 23 In some examples of EXAMPLE 19, the transmission device to identify a change in the relative position of the first display screen and the second display screen. The one or more processor is to execute the instructions to automatically modify and configure a coordinate system of the second display screen in response to the change in the relative position between the first display screen and the second display screen.

EXAMPLE 24 In some examples of EXAMPLE 19, the display screen is a primary display screen and the second display screen is a secondary display screen.

EXAMPLE 25 In some examples of EXAMPLE 19, the display screen is a main display screen and the second display screen is an extended display screen.

EXAMPLE 26 In some examples, a system for display screen configuration includes storage able to store instructions and one or more processor. The one or more processor is able to execute the instructions to identify a relative position between a first display screen and a second display screen, and to automatically adjust one or more coordinates of one or more of the first display screen and the second display screen in response to the identified relative position.

EXAMPLE 27 In some examples of EXAMPLE 26, the system includes a communication device able to provide input to the one or more processor to identify the relative position.

EXAMPLE 28 In some examples of EXAMPLE 27, the communication device is able to provide input to the one or more processor to identify the relative position using a directional beam, beamforming, an antenna beam and/or location identification.

EXAMPLE 29 In some examples of any of EXAMPLES 26-28, where the first display screen is a primary display screen, a main display screen or a display screen of a mobile device, and where the second display screen is a secondary display screen. an extended display screen, or a display screen that is not included in a mobile device.

EXAMPLE 30 In some examples of any of EXAMPLES 26-29, the one or more processor is able to identify a change in the relative position of the first display screen and the second display screen, and is able to automatically modify and configure a coordinate system of the second display screen in response to the change in the relative position between the first display screen and the second display screen.

EXAMPLE 31 In some examples, a method of display screen configuration includes identifying a relative position between a first display screen and a second display screen, and automatically adjusting one or more coordinates of the second display screen in response to the relative position.

EXAMPLE 32 In some examples of EXAMPLE 31, the method includes identifying the relative position using a directional beam, beamforming, an antenna beam and/or location identification.

EXAMPLE 33 In some examples of any of EXAMPLES 31-32, the method includes identifying a direction of the second display screen from the first display screen.

EXAMPLE 34 In some examples of any of EXAMPLES 31-33, where the first display screen is a primary display screen, a main display screen or a display screen of a mobile device, and where the second display screen is a secondary display screen. an extended display screen, or a display screen that is not included in a mobile device.

EXAMPLE 35 In some examples of any of EXAMPLES 31-34, the method includes identifying a change in the relative position of the first display screen and the second display screen, and automatically modifying and configuring a coordinate system of the second display screen in response to the change in the relative position between the first display screen and the second display screen.

EXAMPLE 36 In some examples, a non-transitory computer-readable medium for display screen configuration includes a plurality of instructions that in response to being executed by one or more processor, can cause the one or more processor to identify a relative position between a first display screen and a second display screen, and to automatically adjust one or more coordinates of the second display screen in response to the relative position.

EXAMPLE 37 In some examples of EXAMPLE 36, the plurality of instructions can cause the one or more processor to identify the relative position using a directional beam, beamforming, an antenna beam and/or location identification.

EXAMPLE 38 In some examples of any of EXAMPLES 36-37, the plurality of instructions can cause the one or more processor to identify a direction of the second display screen from the first display screen.

EXAMPLE 39 In some examples of any of EXAMPLES 36-38, where the first display screen is a primary display screen, a main display screen or a display screen of a mobile device, and the second display screen is a secondary display screen. an extended display screen, or a display screen that is not included in a mobile device.

EXAMPLE 40 In some examples of any of EXAMPLES 36-39, where the plurality of instructions can cause the one or more processor to identify a change in the relative position of the first display screen and the second display screen, and to automatically modify and configure a coordinate system of the second display screen in response to the change in the relative position between the first display screen and the second display screen.

EXAMPLE 41 In some examples, a system for display screen configuration includes a transmission device associated with a display screen, storage to store instructions, and one or more processor. The transmission device is able to determine a relative position of the transmission device to a second transmission device associated with a second display screen. The transmission device is also able to identify a relative position between the transmission device and the second transmission device. The one or more processor is able to execute the stored instructions to automatically adjust one or more relative coordinates of the display screen and the second display screen in response to the relative position.

EXAMPLE 42 In some examples of EXAMPLE 41, the transmission device includes a transmitter and the second transmission device includes a receiver.

EXAMPLE 43 In some examples of any of EXAMPLES 41-42, the transmission device is able to determine the relative position using a directional beam, beamforming, an antenna beam and/or location identification.

EXAMPLE 44 In some examples of any of EXAMPLES 41-43, where the transmission device is able to determine a direction of the second display screen from the first display screen.

EXAMPLE 45 In some examples of any of EXAMPLES 41-44, where the transmission device is able to identify a change in the relative position of the first display screen and the second display screen. The processor is able to execute the instructions to automatically modify and configure a coordinate system of the second display screen in response to the change in the relative position between the first display screen and the second display screen.

EXAMPLE 46 In some examples, an apparatus for display screen configuration includes means for identifying a relative position between a first display screen and a second display screen, and means for adjusting one or more coordinates of the second display screen in response to the relative position.

EXAMPLE 47 In some examples of EXAMPLE 46, the apparatus includes means for identifying the relative position using a directional beam, beamforming, an antenna beam and/or location identification.

EXAMPLE 48 In some examples of any of EXAMPLES 46-47, the apparatus includes means for identifying a direction of the second display screen from the first display screen.

EXAMPLE 49 In some examples of any of EXAMPLES 46-48, the first display screen is a primary display screen, a main display screen or a display screen of a mobile device, and the second display screen is a secondary display screen, an extended display screen, or a display screen that is not included in a mobile device.

EXAMPLE 50 In some examples of any of EXAMPLES 46-49, the apparatus including means for identifying a change in the relative position of the first display screen and the second display screen, and means for modifying and configuring a coordinate system of the second display screen in response to the change in the relative position between the first display screen and the second display screen.

EXAMPLE 51 In some examples, a system for display screen configuration includes storage to store instructions, and one or more processor to execute the instructions. The one or more processor can execute the instructions to identify a relative position between a first display screen and a second display screen, and to automatically adjust one or more coordinates of one or more of the first display screen and the second display screen in response to the identified relative position.

EXAMPLE 52 In some examples, the system of EXAMPLE 51 includes a communication device that is able to provide input to the one or more processor to identify the relative position.

EXAMPLE 53 In some examples of EXAMPLE 52, where the communication device is able to provide input to the one or more processor to identify the relative position using a directional beam, beamforming, an antenna beam and/or location identification.

EXAMPLE 54 In some examples of any of EXAMPLES 51-53, the first display screen is a primary display screen and the second display screen is a secondary display screen.

EXAMPLE 55 In some examples of any of EXAMPLES 51-54, the first display screen is a main display screen and the second display screen is an extended display screen. In some examples of any of EXAMPLES 51-54, the first display screen is a display screen of a mobile device, and the second display screen is a display screen that is not part of a mobile device.

EXAMPLE 56 In some examples of any of EXAMPLES 51-55, where the one or more processor is able to identify a change in the relative position of the first display screen and the second display screen, and to automatically modify and configure a coordinate system of the second display screen in response to the change in the relative position between the first display screen and the second display screen.

EXAMPLE 57 In some examples, a method of display screen configuration includes identifying a relative position between a first display screen and a second display screen, and automatically adjusting one or more coordinates of the second display screen in response to the relative position.

EXAMPLE 58 In some examples of EXAMPLE 57, the method includes identifying the relative position using a directional beam, beamforming, an antenna beam and/or location identification.

EXAMPLE 59 In some examples of any of EXAMPLES 57-58, the method includes identifying a direction of the second display screen from the first display screen.

EXAMPLE 60 In some examples of any of EXAMPLES 57-59, the first display screen is a primary display screen and the second display screen is a secondary display screen.

EXAMPLE 61 In some examples of any of EXAMPLES 57-60, the first display screen is a main display screen and the second display screen is an extended display screen.

EXAMPLE 62 In some examples of any of EXAMPLES 57-61, the method includes identifying a change in the relative position of the first display screen and the second display screen. The method can also include automatically modifying and configuring a coordinate system of the second display screen in response to the change in the relative position between the first display screen and the second display screen.

EXAMPLE 63 In some examples, a machine readable medium includes code, when executed, to cause a machine to perform the method of any of the preceding EXAMPLES.

EXAMPLE 64 In some examples, a system for display screen configuration includes a transmission device associated with a display screen. The transmission device can determine a relative position of the transmission device to a second transmission device associated with a second display screen. The transmission device can identify a relative position between the transmission device and the second transmission device. The system also includes storage to store instructions, and one or more processor. The one or more processor can execute the instructions to automatically adjust one or more relative coordinates of the display screen and the second display screen in response to the relative position.

EXAMPLE 65 In some examples of the system of EXAMPLE 64, the transmission device includes a transmitter and the second transmission device includes a receiver.

EXAMPLE 66 In some examples of the system of any of EXAMPLES 64-65, the transmission device can determine the relative position using a directional beam, beamforming, an antenna beam and/or location identification.

EXAMPLE 67 In some examples of the system of any of EXAMPLES 64-66, the transmission device can determine a direction of the second display screen from the first display screen.

EXAMPLE 68 In some examples of the system of any of EXAMPLES 64-67, the first display screen is a primary display screen and the second display screen is a secondary display screen.

EXAMPLE 69 In some examples of the system of any of EXAMPLES 64-68, the first display screen is a main display screen and the second display screen is an extended display screen.

EXAMPLE 70 In some examples of the system of any of EXAMPLES 64-69, the transmission device can identify a change in the relative position of the first display screen and the second display screen. The processor can execute the instructions to automatically modify and configure a coordinate system of the second display screen in response to the change in the relative position between the first display screen and the second display screen.

EXAMPLE 71 In some examples, an apparatus for display screen configuration includes means for identifying a relative position between a first display screen and a second display screen. The apparatus for display screen configuration can also include means for adjusting one or more coordinates of the second display screen in response to the relative position.

EXAMPLE 72 In some examples of the apparatus of EXAMPLE 71, the apparatus can include means for identifying the relative position using a directional beam, beamforming, an antenna beam and/or location identification.

EXAMPLE 73 In some examples of the apparatus of any of EXAMPLES 71-72, the apparatus can include means for identifying a direction of the second display screen from the first display screen.

EXAMPLE 74 In some examples of the apparatus of any of EXAMPLES 71-73, the first display screen is a primary display screen and the second display screen is a secondary display screen.

EXAMPLE 75 In some examples of the apparatus of any of EXAMPLES 71-74, the apparatus can include means for identifying a change in the relative position of the first display screen and the second display screen. The apparatus can also include means for modifying and configuring a coordinate system of the second display screen in response to the change in the relative position between the first display screen and the second display screen.

EXAMPLE 76 In some examples, a method of display screen configuration includes identifying a relative position between a first display screen and a second display screen and automatically adjusting one or more coordinates of the second display screen in response to the relative position.

EXAMPLE 77 In some examples of the method of EXAMPLE 76, the method can include providing an input from a communication device to identify the relative position.

EXAMPLE 78 In some examples, a method of any preceding example can include identifying the relative position using a directional beam, beamforming, an antenna beam and/or location identification.

EXAMPLE 79 In some examples, a method of any preceding example can include identifying a direction of the second display screen from the first display screen.

EXAMPLE 80 In some examples of a method of any preceding example, the first display screen is a primary display screen and the second display screen is a secondary display screen.

EXAMPLE 81 In some examples of a method of any preceding example, the first display screen is a main display screen and the second display screen is an extended display screen.

EXAMPLE 82 In some examples, a method of any preceding example can include identifying a change in the relative position of the first display screen and the second display screen. The method can also include automatically modifying and configuring a coordinate system of the second display screen in response to the change in the relative position between the first display screen and the second display screen.

EXAMPLE 83 In some examples, a method of any preceding example can include using a first transmission device associated with the first display screen. The first transmission device can determine a relative position of the first transmission device to a second transmission device associated with the second display screen. The first transmission device can identify a relative position between the first transmission device and the second transmission device.

EXAMPLE 84 In some examples, a method of EXAMPLE 83, where the first transmission device includes a transmitter and the second transmission device includes a receiver.

EXAMPLE 85 In some examples, a method of any of EXAMPLES 83-84, where the first transmission device is coupled to the first display screen and the second transmission device is coupled to the second display screen.

EXAMPLE 86 In some examples, a method of any of EXAMPLES 83-85, including using the first transmission device to determine the relative position using a directional beam, beamforming, an antenna beam and/or location identification.

EXAMPLE 87 In some examples, a method of any of EXAMPLES 83-86, including using the first transmission device to determine a direction of the second display screen from the first display screen.

EXAMPLE 88 In some examples, a method of any of EXAMPLES 83-87, including using the first transmission device and/or the second transmission device to identify a change in the relative position of the first display screen and the second display screen.

EXAMPLE 89 In some examples, an apparatus includes means to perform a method as in any preceding EXAMPLE.

EXAMPLE 90 In some examples, machine-readable storage includes machine-readable instructions. When executed, the machine-readable instructions can implement a method or realize an apparatus as in any preceding EXAMPLE.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus for display screen configuration, the apparatus comprising:
    at least one storage device or storage disk;
    machine-readable instructions; and
    at least one processor to execute the machine-readable instructions to at least:
        store a previous coordinate position of a first display screen;
        determine whether a first position of the first display screen associated with a first coordinate system is within a threshold proximity of a second position of a second display screen associated with a second coordinate system, the determination of the threshold proximity is based on formation of a beam between the first display screen and the second display screen; and
        after a determination that the first position is within the threshold proximity of the second position:
            determine whether the first display screen was previously configured;
            after to the determination that the first display screen was previously configured, determine whether the first position of the first display screen changed relative to a previous coordinate position of the first display screen; and
            after a determination that the first display screen was previously configured, update the second position of the second display screen relative to the first position of the first display screen, the determination that the first display screen was not previously configured causes enablement of the first display screen to connect to the second display screen and storage of the first position of the first display screen.

2. The apparatus of claim 1, wherein the at least one processor is to execute the machine-readable instructions to, in response to determining that the first position in not within the threshold proximity of the second position, adjust the first coordinate of the first display screen to unpair the first display screen.

3. The apparatus of claim 1, wherein the at least one processor is to execute the machine-readable instructions to determine the first position of the first display screen relative to the second position of the second display screen based on formation of a beam between a transmitter of the second display screen and a receiver of the first display screen.

4. The apparatus of claim 1, wherein the at least one processor is to execute the machine-readable instructions to:

determine whether the first display screen is enabled to create a connection with the second display screen; and in response to determining that the first display screen is enabled to create the connection, update the first position relative to the second position.

5. The apparatus of claim 1, wherein the first display screen is a secondary display screen and the second display screen is a primary display screen.

6. The apparatus of claim 1, wherein at least one of the first position, the threshold proximity, or the second position correspond to at least one of two-dimensional location, three-dimensional location, or rotational position.

7. The apparatus of claim 1, wherein the determination is a first determination, and the at least one processor is to, after a second determination that the at least one processor is unable to determine the first position, indicate that manual adjustment of at least one of the first coordinate or the second coordinate within a graphics properties page is to be implemented.

8. At least one storage device or storage disk comprising instructions for display screen configuration which, when executed, cause at least one processor to at least:
store a previous coordinate position of a first display screen;
determine whether a first position of the first display screen associated with a first coordinate system is within a threshold distance of a second position of a second display screen associated with a second coordinate system, the determination of the threshold distance based on formation of a beam between the first display screen and the second display screen; and
after determining that the first position is within the threshold distance of the second position:
determine whether the first display screen was previously configured;
after the determination that the first display screen was previously configured, determine whether the first position of the first display screen changed relative to a previous coordinate position of the first display screen; and
after a determination that the first display screen was previously configured, update the second position of the second display screen relative to the first position of the first display screen, the determination that the first display screen was not previously configured causes enablement and storage of the first position of the first display screen.

9. The at least one storage device or storage disk of claim 8, wherein the instructions, when executed, cause the at least one processor to, in response to determining that the first position is not within the threshold distance of the second position, adjust the first coordinate of the first display screen to unpair the first display screen.

10. The at least one storage device or storage disk of claim 8, wherein the instructions, when executed, cause the at least one processor to determine the first position of the first display screen relative to the second position of the second display screen based on formation of a beam between a transmitter of the second display screen and a receiver of the first display screen.

11. The at least one storage device or storage disk of claim 8, wherein the instructions, when executed, cause the at least one processor to:
determine whether the first display screen is enabled to establish a connection with the second display screen; and in response to determining that the first display screen is enabled to establish the connection, update the first position relative to the second position.

12. The at least one storage device or storage disk of claim 8, wherein the first display screen is a secondary display screen and the second display screen is a primary display screen.

13. The at least one storage device or storage disk of claim 8, wherein at least one of the first position, the threshold distance, or the second position correspond to at least one of two-dimensional location, three-dimensional location, or rotational position.

14. The at least one storage device or storage disk of claim 8, wherein the instructions, when executed, cause the at least one processor to, after determining that the at least one processor is unable to determine the first position, indicate that manual adjustment of at least one of the first coordinate or the second coordinate within a graphics properties page is to be implemented.

15. A method for display screen configuration, the method comprising:
storing, by executing an instruction with at least one processor, a previous coordinate position of a first display screen;
determining, by executing an instruction with at least one processor, whether a first position of a first display screen is within a threshold proximity of a second position of a second display screen, the first display screen to execute content rendering based on a first coordinate system, the second display screen to execute content rendering based on a second coordinate system, the determination of the threshold proximity based on formation of a beam between the first display screen and the second display screen; and
after determining that the first position is within the threshold proximity of the second position:
determining whether the first display screen is stored within the storage device was previously configured;
after determining that the first display screen was previously configured, determining whether the first position of the first display screen changed relative to a previous coordinate position of the first display screen; and
after determining that the first display screen was previously configured, updating the second position of the second display screen relative to the first position of the first display screen, the determination that the first display screen was not previously configured causing enablement and storage of the first position of the first display screen.

16. The method of claim 15, further including, in response to determining that the first position is not within the threshold proximity of the second position, adjusting the first coordinate of the first display screen to unpair the first display screen.

17. The method of claim 15, further including determining the first position of the first display screen relative to the second position of the second display screen based on formation of a beam between a transmitter of the second display screen and a receiver of the first display screen.

18. The method of claim 15, further including:
determining whether the first display screen is enabled to have a connection with the second display screen; and
in response to determining that the first display screen is enabled to have the connection, update the first position relative to the second position.

19. The method of claim 15, wherein the first display screen is a secondary display screen and the second display screen is a primary display screen.

20. The method of claim 15, wherein at least one of the first position, the threshold proximity, or the second position correspond to at least one of two-dimensional location, three-dimensional location, or rotational position.

21. The method of claim 15, further including, after determining that the first position is unable to be determined, indicating that manual adjustment of at least one of the first coordinate or the second coordinate within a graphic properties page is to be implemented.

* * * * *